L. A. SUBERS.
LAMINATED COHESIVE INTERWOUND FABRIC CONSTRUCTED IN TUBULAR AND ANNULAR FORM.
APPLICATION FILED APR. 1, 1914.
1,132,634.
Patented Mar. 23, 1915.
2 SHEETS—SHEET 1.
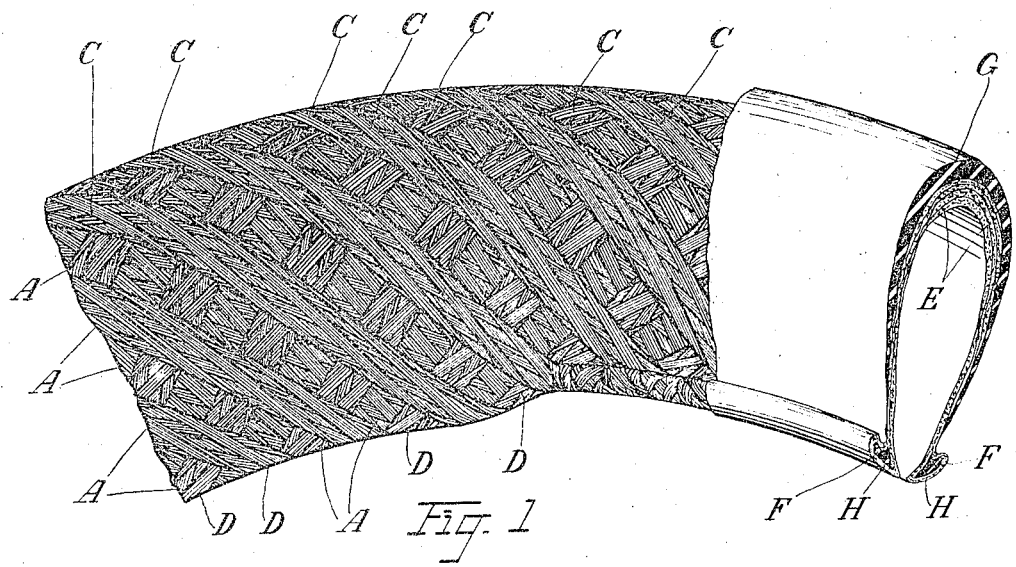
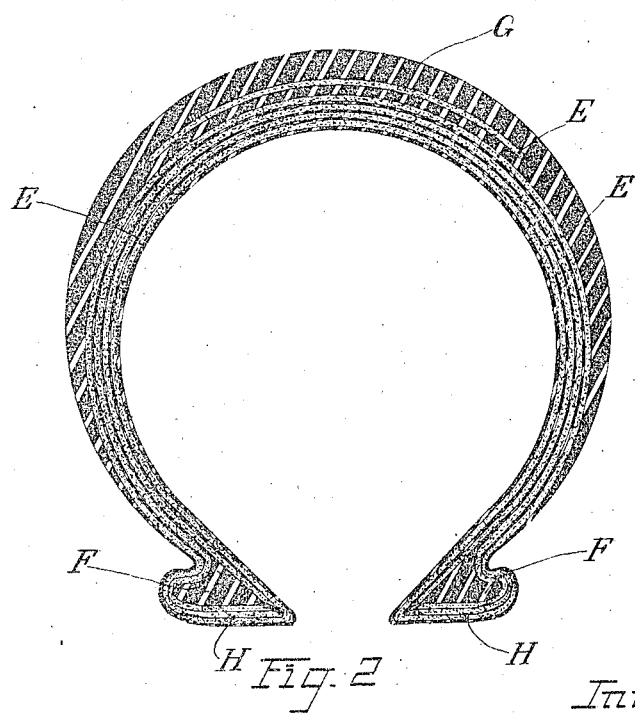

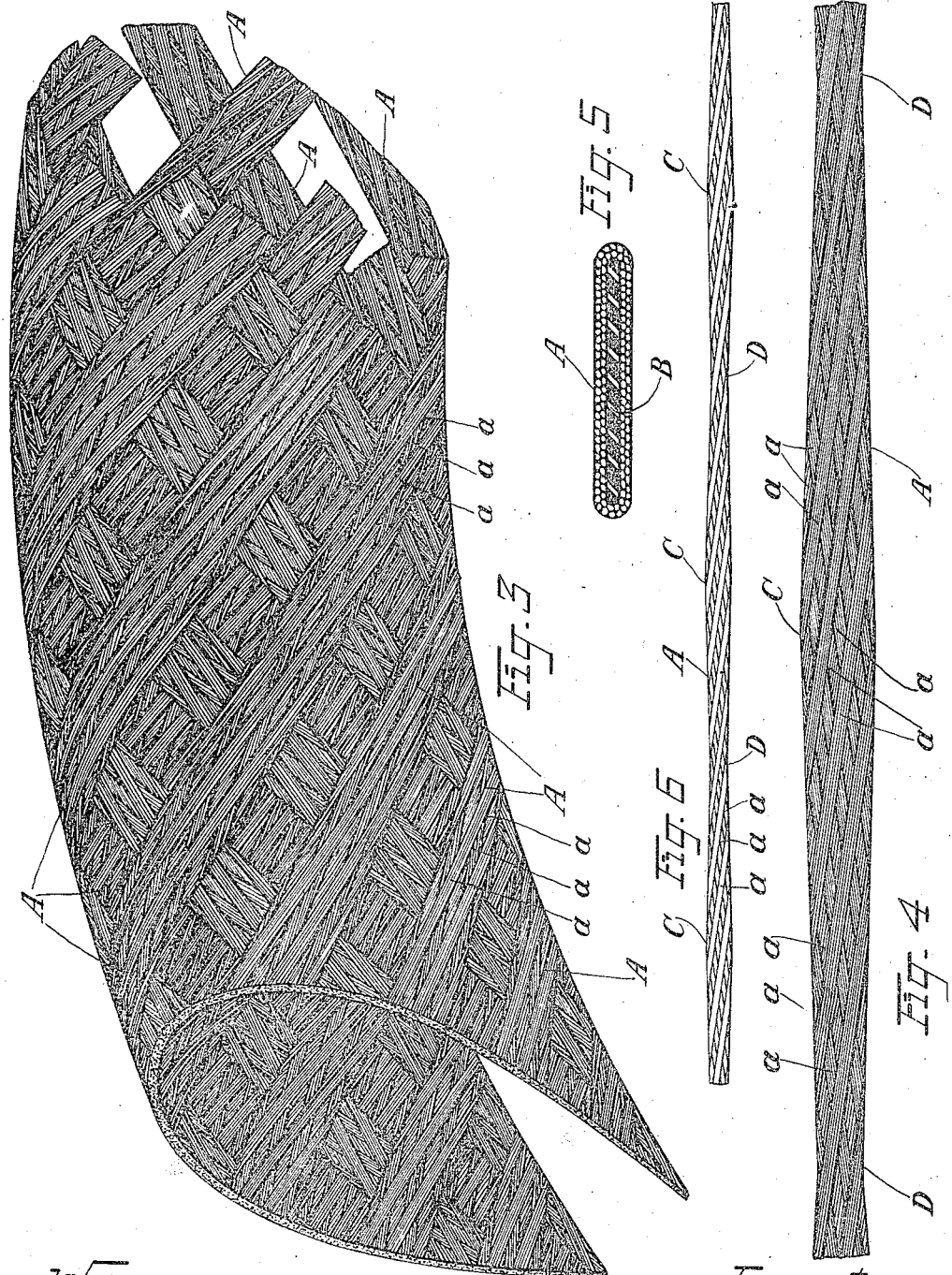

UNITED STATES PATENT OFFICE.

LAWRENCE A. SUBERS, OF CLEVELAND, OHIO.

LAMINATED COHESIVE INTERWOUND FABRIC CONSTRUCTED IN TUBULAR AND ANNULAR FORM.

1,132,634.　　　　　Specification of Letters Patent.　　Patented Mar. 23, 1915.

Application filed April 1, 1914. Serial No. 828,712.

*To all whom it may concern:*

Be it known that I, LAWRENCE A. SUBERS, a citizen of the United States, and resident of Cleveland, in the county of Cuyahoga and State of Ohio, have invented certain new and useful Improvements in Laminated Cohesive Interwound Fabric Constructed in Tubular and Annular Form, of which I hereby declare, the following to be a full, clear, and exact description, such as will enable others skilled in the art to which it appertains to make and use the same.

The objects of the invention are to provide an improved form of fabric from which a pneumatic tire for an automobile or other vehicle can be produced, or an annular tube for any purpose, and in which the completed fabric is constructed in a tubular and annular form, whereby no molding or stretching of the fabric is required to make it conform to the shape of the rim of a vehicle wheel, and therefore no distortion or tension is put upon the component members of the fabric.

The invention is an improvement upon the construction of the laminated, cohesive, interwound fabric described in my prior Letters Patent No. 1,021,014 granted to me upon March 26th, 1912, and upon the construction of the band shown and described in my prior Letters Patent upon improvements in bands bearing No. 1,017,271, granted to me upon February 13th, 1912. In these prior patents a fabric is shown and described which is formed from interlaid, crossing bands, wound in parallel spaced rows and laminated to form the number of layers necessary to produce the required strength, and in which the bands themselves are similarly constructed in laminations of interlaid, crossing fibrous elements, cohering together in an adhesive substance.

An important feature of these inventions is found in the adjustability of the amount of expansive and elongation obtained in a tubular fabric under internal or external pressure by this mode of construction, since the amount of elongation in the component bands can be controlled by modifying the angle at which the component fibers are laid therein and also the amount of expansion and elongation in the completed fabric tube is susceptible of control by modifying the angle at which the bands are laid in the fabric. This fabric has hitherto been constructed in tubular shape upon a straight mandrel, and has been slit lengthwise to form a sheet of fabric of any desired length, the circumference of the tube being equal to the width desired. When used for tire fabric, this sheet has been stretched around the tire core until the edges of the fabric have conformed to the circumference at the side of the tire and the middle of the fabric has been expanded to correspond to the larger circumference of the tread side. Thus the bands have been stretched laterally, and distorted from their previous angular positions, and their fibrous members have been displaced and separated and subjected to an initial tension. Hence the expansibility of the fabric when incorporated in a tire has been so affected by the distortion of the fabric as to reduce its strength and resiliency. To overcome these objectionable features, the cohesive bands, constructed as described in the prior patents are given the proper form and are then wound and laminated upon a mandrel of annular shape and preferably of circular cross section, the outside diameter of the annular mandrel being approximately equal to the outside diameter of the core upon which the fabric is placed in constructing the tire, so that the fabric thus needs practically no stretching or shaping to conform it to the shape of tire core.

The band is so formed as to gradually narrow or taper from a certain width in a certain distance to a predetermined smaller width and then to gradually increase in a similar distance to its original width, thus having continuously and regularly recurring wide portions and narrow portions. These wide portions and narrow portions are so spaced that when the bands are wound diagonally around the annular mandrel the wide portions will always come upon the line of greatest circumference and the narrow portions upon the line of least circumference, so that when this fabric is incorporated in a tire the wide portions will come upon the tread side and the narrow portions upon the rim side. The constant taper of the band from a wide to a narrow part and vice versa permits the bands when continuously wound around an annular mandrel of a predetermined cross section and diameter to have their edges constantly touch the edges of the adjoining parallel rows of bands as interwound and laminated to form this fabric previously described.

The invention is hereinafter further described, shown in the accompanying drawings and specifically pointed out in the claims.

In the accompanying drawings Figure 1 is a perspective view of a pneumatic tire or casing, portions being broken away to show the construction of the fabric; Fig. 2 is a transverse section thereof; Fig. 3 is a perspective view of a portion of one layer of the fabric in readiness for incorporation in a tire or casing; Fig. 4 is a portion of one band forming one complete turn about the tire and having a central portion of a predetermined width and gradually tapering toward the ends; Fig. 5 is an enlarged transverse section of one of the bands; Fig. 6 is a plan view upon a reduced scale showing the periodical regularly spaced changes in width in a band.

In these views A, A, are the bands which are formed of interwound, cohering, parallel, regularly spaced fibrous elements $a$—$a$ which cohere together in an adhesive substance such as india rubber. These bands are formed first in tubular form and the adhesive substance is inclosed therein as shown at B Fig. 5 and the tube is compressed into band form, the walls adhering together.

The device upon which the tubular band is formed or shaped causes regularly spaced alternate wide and narrow parts in the band, the wide part gradually tapering to the narrow part and vice versa, the distance between these wide parts and narrow parts being so determined that the wide part will repeatedly occur at the largest circumference of the annular mandrel upon which the band is to be wound and the narrow part at the least circumference of the mandrel. The fabric is first formed in annular and tubular form and to construct a tire casing is then cut longitudinally at the rim side, the edges being molded into clencher form or with straight sides to conform to the shape desired to manufacture.

In Figs. 1 and 2 a clencher tire or casing is shown. As many layers of fabric can be superimposed in the tire as may be required and being of the required shape when manufactured are not distorted when placed in the tire. These layers are shown at E, E, Figs. 1 and 2 and portions of the edges of them are bent or molded at H, H, about the annular rings or beads F, F, to form the clencher shape. The tread surface can be protected by any thickness of rubber or other protection G desired. The entire tire can then be vulcanized to form a homogeneous substantially integral structure without alteration of the predetermined relative positions of the component bands in the fabric, and with practically no initial strain thereupon.

It is a well known fact that wherein a predetermined width of a woven fabric is treated with rubber and used for pneumatic tire construction, it is applied in such a manner that the threads therein lie diagonally across the tread and the fabric is stretched around the circumference of the tire core to conform to the shape thereof, thereby stretching the fabric and separating the threads therein around the outer circumference, and also forcing the fabric together to conform to the inner circumference or rim side of the tire. Any flat sheet of fabric when applied to such a purpose would be affected in similar manner.

Having described the invention what I claim as new and desire to secure by Letters Patent is:

1. An annular and tubular fabric, comprising, a layer of laminated cohering fabric bands, said bands diagonally and continuously wound therein, one series of bands crossing another series of bands at an angle, each band having regularly recurring wide portions located upon the outer circumference of the fabric and tapering from said wide portions in both directions toward the inner circumference of said fabric.

2. An annular, tubular fabric, composed of interwound regularly spaced series of cohering fabric bands, one series crossing the other at an angle, the bands running in one direction overlapping the bands crossing the same, and filling the spaces between bands of the same series, said bands being tapered from the outer circumference to the inner circumference of said fabric, substantially as described.

3. In an annular, tubular fabric, continuously wound diagonally laid fabric bands interwound and cohering together, said bands being wider upon the outer periphery of said fabric, and tapering thence to the inner periphery thereof.

In testimony whereof, I hereunto set my hand this 28th day of March, 1914.

LAWRENCE A. SUBERS.

In presence of—
ERNEST MOSMAN,
ADAM MEYER.